United States Patent
Bravo

(10) Patent No.: US 7,650,834 B2
(45) Date of Patent: Jan. 26, 2010

(54) MACHINE FOR THE PRODUCTION OF ICE-CREAM PORTIONS EQUIPPED WITH A FEEDING DEVICE FOR A PREPARATION

(76) Inventor: Francesco Bravo, Via Vincenzo Monti 13, I-36075 Montecchio Maggiore (Vicenza) (IT)

( * ) Notice: Subject to any disclaimer, the term of this patent is extended or adjusted under 35 U.S.C. 154(b) by 466 days.

(21) Appl. No.: 10/545,189

(22) PCT Filed: Feb. 20, 2004

(86) PCT No.: PCT/EP2004/001790

§ 371 (c)(1),
(2), (4) Date: Aug. 9, 2005

(87) PCT Pub. No.: WO2004/075651

PCT Pub. Date: Sep. 10, 2004

(65) Prior Publication Data

US 2006/0137542 A1   Jun. 29, 2006

(30) Foreign Application Priority Data

Feb. 25, 2003 (IT) .......................... MI2003A0326

(51) Int. Cl.
*A23G 9/00* (2006.01)
(52) U.S. Cl. .............................. 99/455; 99/348; 62/342
(58) Field of Classification Search ........... 99/452–455, 99/516, 517, 348, 485, 486; 62/135, 303, 62/342, 343; 366/144–149, 177.1; 222/55, 222/129.4, 131, 132, 146.6
See application file for complete search history.

(56) References Cited

U.S. PATENT DOCUMENTS

| | | | | |
|---|---|---|---|---|
| 3,904,085 A | | 9/1975 | Bartyan | |
| 4,548,054 A | * | 10/1985 | Levine | 62/342 |
| 4,637,221 A | * | 1/1987 | Levine | 62/342 |
| 4,703,628 A | | 11/1987 | Togashi et al. | |
| 4,740,088 A | * | 4/1988 | Kelly, Jr. | 366/138 |
| 4,853,518 A | * | 8/1989 | Bravo | 219/441 |
| 4,964,333 A | * | 10/1990 | Bravo | 99/455 |
| 5,018,363 A | | 5/1991 | Aoki et al. | |
| 5,208,050 A | * | 5/1993 | Ney | 425/202 |
| 5,501,367 A | | 3/1996 | Chigira | |
| 5,799,832 A | * | 9/1998 | Mayo | 222/135 |
| 2003/0085237 A1 | | 5/2003 | Kateman et al. | |

FOREIGN PATENT DOCUMENTS

| | | |
|---|---|---|
| DE | 22 25 518 | 12/1973 |
| WO | WO 00/36925 | 6/2000 |

* cited by examiner

*Primary Examiner*—Timothy F. Simone
(74) *Attorney, Agent, or Firm*—James V. Costigan; Hedman & Costigan, P.C.

(57) ABSTRACT

A machine for the production of ice-cream in portions is equipped with a feeding device for a preparation comprising a whisking cylinder (15), cooled by a cooling circuit and equipped with a propeller mixer (16) and means for discharging the ice-cream produced. Said machine further comprises a feeding device (11, 11') for feeding a dose of preparation for ice-cream into said cylinder (15) which includes a series of containers (30, 30') containing a preparation or composition, for the production of a number of doses of ice-cream, supply means (40) of a quantity of preparation, a collection and mixing tank (35) and an interception device (41) of a feeding channel (36) of the preparation towards said whisking cylinder (15).

14 Claims, 2 Drawing Sheets

MACHINE FOR THE PRODUCTION OF ICE-CREAM PORTIONS EQUIPPED WITH A FEEDING DEVICE FOR A PREPARATION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

BACKGROUND OF THE INVENTION

1) Field of the Invention

The present invention relates to a machine for the production of ice-cream in doses equipped with a feeding device of a preparation.

2) Description of Related Art

As is well known to experts in the field, the production of ice-cream, with particular but not exclusive reference to home-made ice-cream, is effected by processing a base mixture in suitable machines for the production of ice-cream. Machines of the known type envisage the use of heated pasteurizing devices, optionally of maturing vats, and cooled whisking machines and are equipped with mixers. The ice-cream (as end-product) is fed in continuous through a feeding mouth situated on the front part of the whisking machine, at a negative temperature, but in a pasty or creamy, and in any case spreadable, state. Pushed by the helical mixer, it is collected in small tanks, for example made of stainless steel, supported on a footboard assembled underneath the above feeding mouth.

This type of machine is suitable for the production of large quantities of only one type of ice-cream at a time.

These machines, moreover, are complex with several processing steps and are characterized by a considerable encumbrance.

Known machines for the production of ice-cream cannot be applied to the production of ice-cream in doses with different flavours, for example fed by an automatic distributor.

A dosed ice-cream distributor containing a certain number of tanks of ice-cream already prepared with different flavours, would in fact be extremely bulky and in any case there would be a limited possibility of choice.

The general objective of the present invention is to solve the above drawbacks of the known art in an extremely simple, economical and particularly functional way.

A further objective is to produce doses of ice-cream using a preparation or composition, which can be sterilely preserved in the machine for long periods of time, also at room temperature.

Another objective is to produce a machine for the production of ice-cream in doses equipped with a feeding device of a preparation capable of producing a high number of different flavours of ice-cream.

Yet another objective of the present invention is to produce a machine for the production of ice-cream in doses equipped with a feeding device of a preparation capable of functioning in an automatized way.

BRIEF SUMMARY OF THE INVENTION

In view of the above objectives, according to the present invention, a machine has been conceived for the production of ice-cream in doses equipped with a feeding device of a preparation, having the characteristics illustrated in the enclosed claims.

The structural and functional characteristics of the present invention and its advantages with respect to the known art will appear even more evident from an examination of the following description, referring to the enclosed drawings, which illustrate a machine for the production of ice-cream in doses, equipped with a feeding device of a preparation, designed according to the innovative principles of the invention itself.

DETAILED DESCRIPTION OF THE INVENTION

Figure 1:
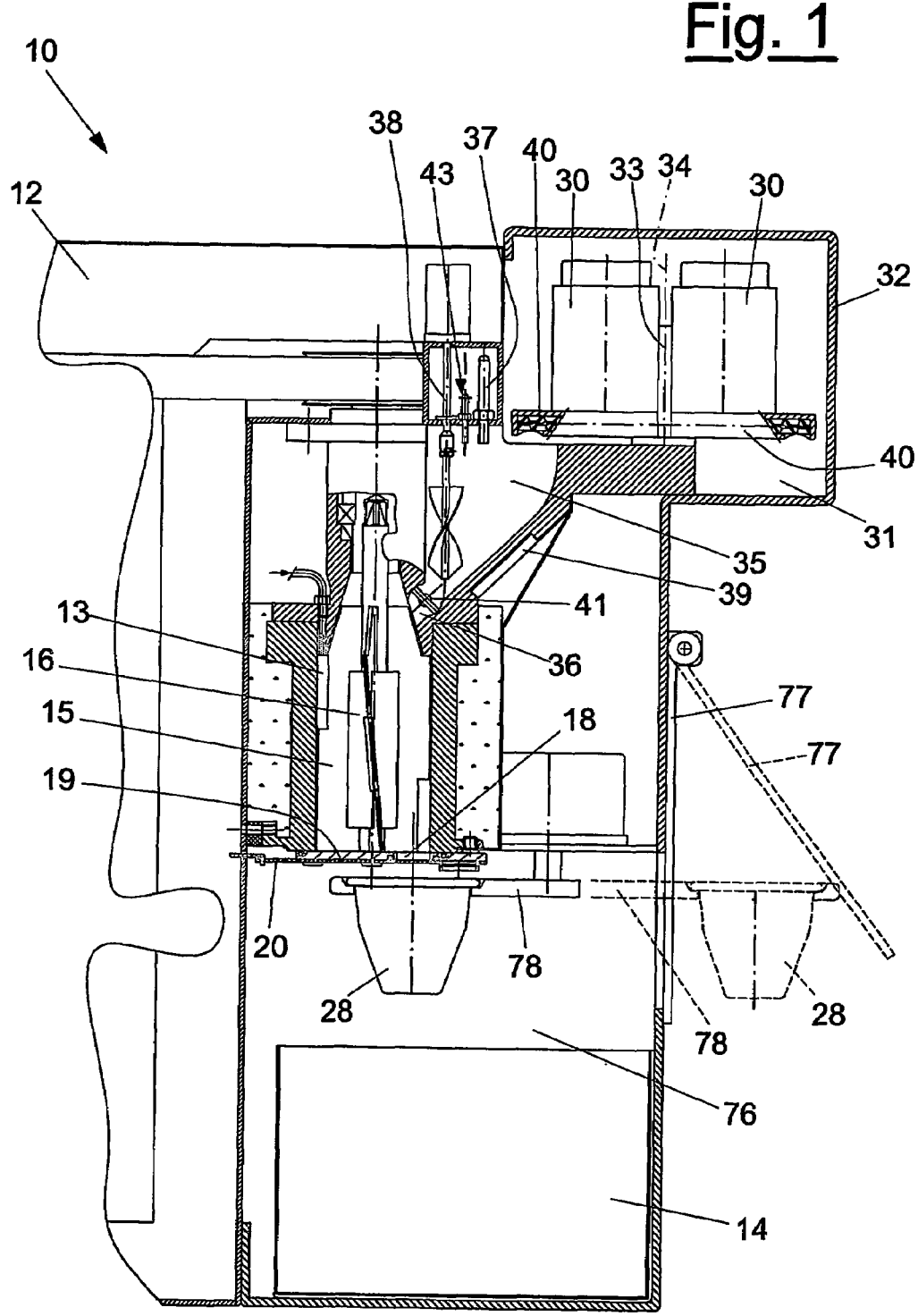
FIG. 1 shows a partially sectional raised side view of a first embodiment of a machine for the production of ice-cream in doses equipped with a feeding device of a preparation object of the present invention.

With reference to the drawings, a machine for the production of ice-cream in doses equipped with a feeding device of a preparation, object of the invention, is indicated as a whole with 10, and in the example illustrated, according to the present invention, comprises a body 12 which encloses a cooling circuit, fed by a compressor, not shown. This cools a whisking cylinder 15, vertical in the example, containing a propeller mixer 16, driven by a mixing motor.

The machine for the production of ice-cream 10 in question is equipped with means for discharging the ice-cream produced, which comprise for example a discharge channel 18 for the ice-cream situated on the bottom 19 of the whisking machine and which is alternatively closed or opened by supply devices 20 of the ice-cream.

Beneath the supply devices 20 there is a closed cell 76 which is accessible by means of a door 77, hinged to the body 12. A collection vessel 28 of the ice-cream produced is situated in the cell 76, for example supported by a moving carrier 78, or with another carrier which, in the example illustrated in the figures with a dashed line, extends it outside the cell 76 for the user.

The machine for the production of ice-cream 10, object of the present invention, can, for example, be equipped with a vaporization nozzle 13, connected to a vapour producer, not shown, which after the production of each dose of ice-cream sprays vapour onto the blades of the slowly rotating mixer 16.

This removes any possible residues of ice-cream remaining on the blades, which would be mixed with the subsequent ice-cream productions. The residues removed are discharged through the discharge channel 18 towards an underlying collection tank 14, which must be periodically cleaned and emptied. The short heating time caused by the vapour does not influence the production time of the subsequent dose.

The vaporizing nozzle 13 is also used for effecting periodic cleaning cycles of a longer duration when washing all the parts in contact with the ice-cream.

The machine for the production of ice-cream in doses 10, object of the present invention, is equipped with a feeding device 11 or 11' of a preparation into the cylinder 15.

The device 11 or 11' comprises a series of containers 30 or 30', each filled with a quantity of preparation, and different for the various flavours of ice-cream to be produced, in which the quantity contained is suitable for the production of several doses of ice-cream.

Figure 2:
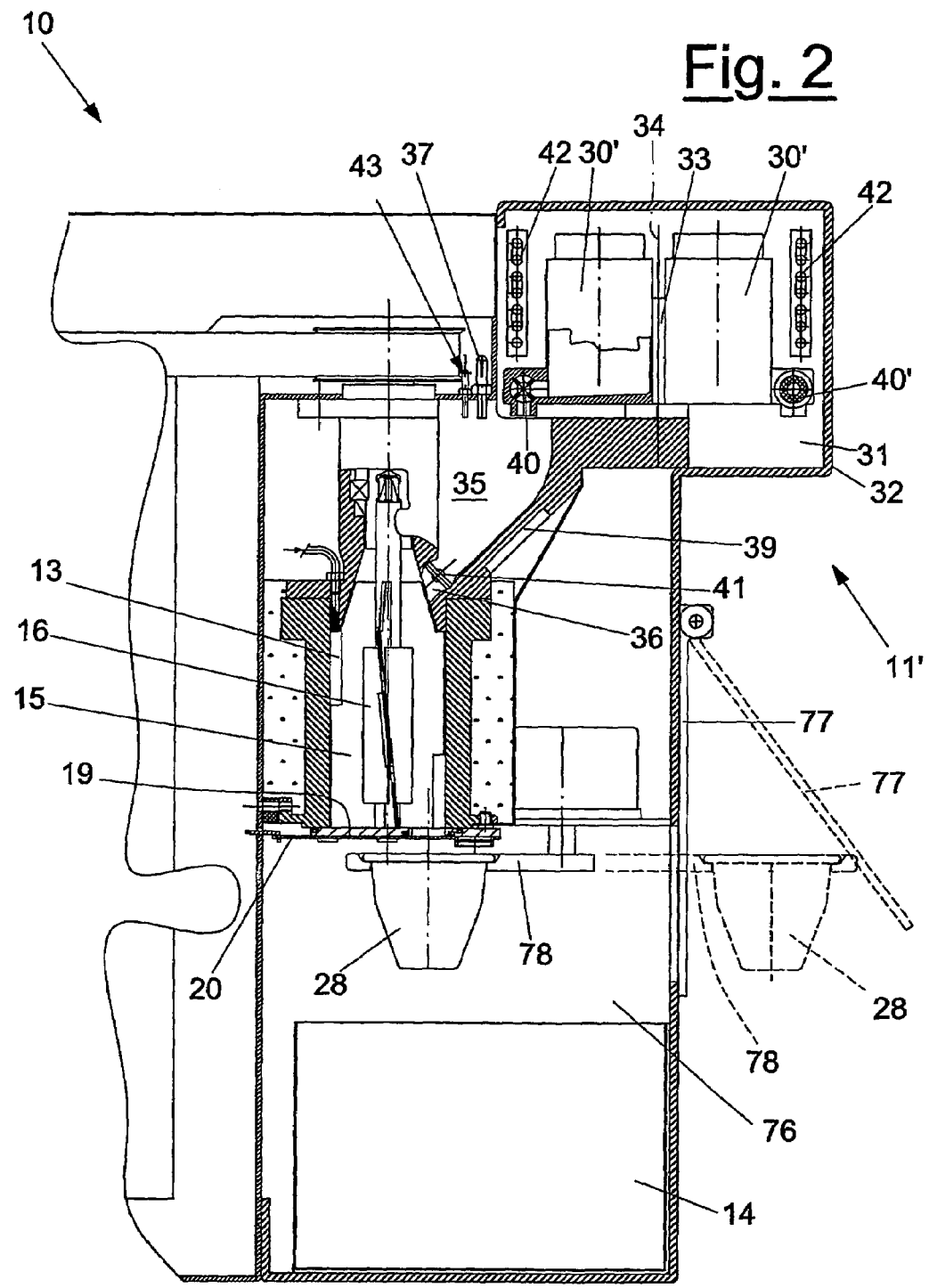
FIG. 2 shows a partially sectional raised side view of a second embodiment of a machine for the production of ice-cream in doses equipped with a feeding device of a preparation object of the present invention.

FIG. 1 shows a first embodiment of the feeding device 11, in which the containers 30 contain a preparation consisting of a mixture in powder form; FIG. 2, on the other hand, shows a second embodiment of the feeding device 11' of a preparation consisting of a liquid mixture contained in the containers 30'.

With reference to FIG. 1, the containers 30, are housed in a chamber 31 equipped with a front wall 32 made of a thermoplastic material, having an opening, not shown, or at least partially removable for the reintroduction of the preparations into the containers 30 and for the necessary cleaning.

The containers 30, 30' are arranged in correspondence with an underlying collection and mixing tank 35 and on the bottom of the mixing tank there is a feeding channel 36 connected to the whisking cylinder 15. The containers 30, 30' are assembled in the feeding device 11 on a rotating device 33 which rotates around a central axis 34, which carries the preselected container 30 in correspondence with the underlying collection and mixing tank 35.

The containers 30 are connected to supply devices 40 of a quantity of preparation suitable for the production of a dose of ice-cream. Said supply devices 40 comprise a calibrated dosing screw associated with each container 30.

A tube 37 enters the tank 35 for supplying hot water in the desired quantity, for example dosed by a volumetric dosage pump, not shown. In the tank, there is also a mixer 38 which, by rotating around its own axis, favours the dissolution of the powder preparation in the hot water.

In an illustrative embodiment, the tank can be heated by means of resistances 39 to favour the dissolution of the preparation. Furthermore, a second vaporization nozzle 43, also connected to the vapour producer, not shown, is included in the tank 35, for periodically spraying a quantity of vapour for sterilizing the collection and mixing tank 35.

On the bottom of the tank there is a feeding channel 36 of the preparation mixed with the whisking cylinder 15 closed by an interception device 41, for example a butterfly valve, whose opening is temporized with the functioning of the machine 10.

FIG. 2 shows an embodiment of the machine for the production of ice-cream in doses 10 fed with a preparation consisting of a liquid mixture contained in the containers 30'.

Analogously to what is described above, the containers 30' are housed in a chamber 31 equipped with a front wall 32 made of a thermoplastic material, at least partially removable or having an opening.

For a more rapid production of the dose of ice-cream, and for a better preservation of the preparation, in particular in the case of a liquid preparation, as shown in FIG. 2, evaporating devices 42 can be positioned in the chamber 31, which preserve the containers 30' in a cooled environment until the moment of use.

The containers 30' and supply devices 40' solidal therewith are also assembled in the feeding device 11', on the rotating device 33. The supply devices 40' of a quantity of preparation suitable for the production of a dose of ice-cream comprise a volumetric dosage pump which guarantees the supply into the collection tank 35 of the desired quantity of mixture from each container 30'.

The introduction of hot water into the tank 35 through the tube 37 and the mixing of the preparation are not strictly necessary in the case of a liquid preparation, but they can still however be envisaged.

When the preparation has been dosed in the tank 35, the opening of the butterfly valve 41 allows the preparation to pass through the feeding channel 36 towards the whisking cylinder 15.

The activation of the ice-cream production cycle, i.e. whisking and cooling is driven, for example, by a sensor, not shown, which monitors the supply of the preparation into the whisking cylinder 15, or in any case temporized.

Further embodiments of the machine for the production of ice-cream in doses 10 equipped with a feeding device of a preparation, object of the present invention, can envisage a housing chamber of containers of different shapes, and also different supply devices of a quantity of preparation for the production of a dose of ice-cream.

The functioning of the machine 10 is synchronized through consensus electronic devices, not shown. After feeding the mixture to the cylinder 15 through the channel 36, according to what is described, the mixer 16 rotates at a high rate to reduce the mixture to extremely fine parts and incorporate air, the rate is then reduced during the whisking period until the ice-cream has been produced. The rate becomes high again in the subsequent extraction phase of the ice-cream produced. A temporizer ends the ice-cream production and the automatic opening of the discharge 18 with the extraction of the ice-cream in the specific underlying glass 28.

When the glass 28 reaches the extraction position of the product, from the vaporization nozzle 13, vapour is automatically emitted for cleaning the ice-cream residues from the mixing blades as the mixer rotates at a slow rate.

These parts of ice-cream are rapidly detached and fall into the underlying collection tank 14. This process lasts about 2-3 seconds, the discharge 18 is then closed by the supply devices 20 and the machine 10 is ready for another cycle.

In this phase, the emission of hot water from the tube 37 or vapour from the nozzle 43 with the valve 41 open, allows the cleaning of the collection and mixing tank 35.

Through vapour sterilization, the machine is advantageously self-protected from bacterial contamination even if it is not followed and washed with care every day, for example in self-service distribution.

From the above description with reference to the figures, it is evident how a machine for the production of ice-cream in doses equipped with a feeding device of a preparation according to the invention is particularly useful and advantageous. In this way the objective specified in the introduction is achieved.

The forms of the machine for the production of ice-cream in doses equipped with a feeding device of a preparation of the invention can obviously differ from that shown as an illustrative but non-limiting example in the drawings, as also the materials.

The protection scope of the invention is therefore delimited by the enclosed claims.

The invention claimed is:

1. A machine for production of ice-cream in doses comprising a whisking cylinder (15), cooled by a cooling circuit and equipped with a propeller mixer (16) and means for discharging ice-cream produced therein into a collection vessel (28), wherein said machine is equipped with a feeding device (11, 11') for feeding a preparation for making ice cream to said whisking cylinder (15) of a dose of preparation for making ice-cream which includes a series of containers (30, 30') connected with supply means (40) to an underlying collection and mixing tank (35) and on the bottom of the mixing tank (35) there is a feeding channel 36 connected to said whisking cylinder (15), said containers (30,30') containing a preparation for production of a number of doses of ice-cream.

2. The machine according to claim 1, wherein said supply means (40) from said containers (30) of a quantity of preparation for making ice cream in powder form comprise a calibrated dosing screw associated with each container (30).

3. The machine according to claim 1, wherein said supply means (40') from said containers (30') of a quantity of liquid preparation for making ice cream comprise a volumetric dosage pump with a volumetric doser associated with each container (30').

4. The machine according to claim 1, wherein said containers (30, 30') are assembled on a rotating device (33) which rotates around a central axis (34) and is adapted for carrying said containers (30, 30') in correspondence with said collection and mixing tank (35).

5. The machine according to claim 1, wherein said containers (30, 30') and said supply devices (40, 40') are housed in a chamber (31) equipped with a front wall (32) made of a thermoplastic material said front wall (32) being at least partially openable.

6. The machine according to claim 5, wherein evaporating devices (42) adapted for cooling said containers (30, 30') are situated in said chamber (31).

7. The machine according to claim 1, wherein said tank (35) comprises a tube (37) for supplying hot water in the desired quantity.

8. The machine according to claim 1, wherein said tank (35) is equipped with a mixer (38).

9. The machine according to claim 1, wherein said chamber (35) is equipped with a resistance heater (39).

10. The machine according to claim 1, wherein said interception devices of said channel (36) comprise a butterfly valve (41).

11. The machine according to claim 1, wherein said channel (36) has a mouth situated on a lower wall of said collection and mixing chamber (35).

12. The machine according to claim 1, wherein said whisking cylinder comprises a vaporization nozzle (13) suitable for spraying a quantity of vapour onto said mixer (16).

13. The machine for the production of ice-cream according to claim 1, wherein said machine comprises a cell (76) below said means for discharging (18) the ice-cream produced, suitable for housing a movable support (78) for a collection container (28) of the end-product.

14. The machine for the production of ice-cream according to claim 1, wherein said tank (35) is equipped with a vaporization nozzle (43) suitable for spraying a quantity of vapour into said tank (35).

* * * * *